3,792,114
Patented Feb. 12, 1974

3,792,114
COMPOSITION OF POLYSULFONES AND POLYURETHANES

Robert Lauchlan, Granger, and Gray Shaw, South Bend, Ind., assignors to Uniroyal, Inc., New York, N.Y.
No Drawing. Filed Aug. 31, 1972, Ser. No. 285,275
Int. Cl. C08g 41/04
U.S. Cl. 260—858                 159 Claims

ABSTRACT OF THE DISCLOSURE

Blends of a polyarylene polyether resin with a polyurethane elastomer provide thermoplastic compositions characterized by unique properties, particularly, an unusually useful combination of high impact strength, high tensile strength and high flexural modulus.

BACKGROUND OF THE INVENTION

(1) Field of the invention

The present invention relates to polyarylene polyether resin compositions characterized by improved impact strength, and flame resistance. More particularly, the invention relates to the thermoplastic resin blend of a polyarylene polyether resin with a polyurethane elastomer.

(2) Description of the prior art

The polyarylene polyether resins are known and described in numerous publications including U.S. Pat. Nos. 3,264,536 and 3,433,479. The high molecular weight polymers are high performance engineering thermoplastics possessing relatively high softening points, i.e., in excess of 275° F. and excellent dimensional stability.

However, the utility of polyarylene polyether resin generally is limited to applications which do not require high impact strength.

STATEMENT OF THE INVENTION

The present invention relates to blends of high molecular weight polyarylene polyether resins with 2 to 25 percent (all percentages are expressed by weight herein) of polyurethane elastomers, which blends are characterized by substantially improved impact strength. Surprisingly, the incorporation of these polyurethane elastomers does not adversely affect the desirable properties of the polyarylene polyether resin, e.g., the high heat distortion temperature and mechanical strength properties of the resin.

Accordingly, the object of the present invention is to provide polyarylene polyether resin compositions having high impact strength which are capable of being formed into articles of manufacture such as thermoformable plastic sheet material.

DESCRIPTION OF THE INVENTION

The polyarylene polyether resins used in the present invention are made up of repeating units which may be represented by the general formula:

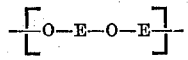

wherein E is the residuum of a dihydric phenol, E' is the residuum of a benzenoid compound having substituted thereon an inert electron withdrawing group, n is a positive integer at least 15, and preferably 20 or more, and where both of said residua are covalently bonded through oxygen ether atoms.

The dihydric phenol residuum (E) may be, for instance, a mononuclear phenylene group, or a di-, tri, or polynuclear phenylene residuum. The dihydric phenol residuum may optionally be substituted with inert nuclear substituents, such as, for example: halogen, alkoxy, alkyl, etc.

It is preferred that the dihydric phenol, providing residuum E, be a weakly acidic dihydric di- or tri-nuclear phenol such as, for example, the dihydroxydiphenyl alkanes, or dihydroxydiphenyl-p-dialkylbenzenes, or the nuclear halogenated derivatives thereof. Suitable dihydric phenols include, for example: 2,2-bis(4-hydroxy phenyl) propane, bis(4-hydroxyphenyl) methane, 1,1-bis(4-hydroxy phenyl)-2-phenyl ethane, α,α-bis(4-hydroxy phenyl) - p - diisopropylbenzene, α,α-bis(4-hydroxyphenyl)-p-xylene, etc. Suitable nuclear halogenated dihydric phenols include, for example: 2,2 - bis(3,5 - dichloro-4-hydroxyphenyl)propane, 2,2 - bis(3,5-dibromo-4-hydroxyphenyl) propane, etc. Other suitable dihydric di-, tri-, or polynuclear phenols are those in which the phenol residua are joined through a heteroatom functional group, such as for example: oxygen ether (—O—), carbonyl (—CO—)

sulfide (—S—), sulfone (—SO$_2$—).

It is also contemplated that a mixture of two or more different dihydric phenols may be used to accomplish the same ends as above. Thus, when referred to above the E residuum in the polymer structure can actually be the same or different aromatic residua. As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The benzenoid residuum (E) may be derived from any dihalobenzenoid compound, wherein the two halogen atoms are bonded to benzene rings having an electron withdrawing group in at least one of the positions ortho and para to the halogen group. Such dihalobenzenoid compounds may be either mononuclear, where the halogens are attached to the same benzenoid ring, or polynuclear, where the halogens are attached to different benzenoid rings, as long as the activating electron withdrawing group is in the ortho or para position of the benzenoid nucleus. The more reactive halogens, chlorine and fluorine, are the preferred halogen substituents. The electron withdrawing group is preferably a strong activating group such as a sulfone (—SO$_2$—), ketone (—CO—), sulfoxide (—SO—), vinyl (—CH=CH—), or azo (—N=N—).

If desired, polymers may be made wtih mixtures of two or more dihalobenzenoid compounds, each of which have the structure described in the preceding paragraph. Thus the E' residuum of the benzenoid compounds in the polymer structure may be the same or different. It is seen also that as used herein, the E' term defined as being the "residuum of the benzenoid compound" refers to the aromatic or benzenoid residue of the compound after the removal of the halogen atoms on the benzenoid nucleus.

The preferred polyarylene polyether resins are those composed of recurring units having the formula:

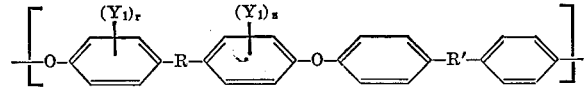

wherein R is a divalent connecting radical, R' is a strong activating electron withdrawing group, Y and Y$_1$ are inert nuclear halogen, alkyl, or alkoxy substituent groups, and r and z are integers having a value of from 0 to 4 inclusive.

Even more preferred are the polyarylene polyether resins of the above formula wherein E is a divalent alkyl or divalent p-dialkyl-benzenoid group, E' is a sulfone (—SO$_2$—) group, and r and z are zero.

Typical examples of polyarylene polyether resins and methods for making same are found in U.S. Pats. 3,264,536; 3,423,479; 3,554,972; 3,555,119; U.S. application Ser. No. 39,631 filed May 22, 1970; and in New Linear Polymers, Chap. 5, by Lee et al., the text of which patents and reference are incorporated herein as a further description of the polyarylene polyether resins with which the present invention is concerned.

The polyurethane elastomers used in the present invention are substantially uncrosslinked polyester or polyether urethanes which exhibit some degree of thermoplasticity. The polyester urethane elastomers comprise the reaction products of a mixture of (a) an essentially linear, hydroxyl terminated polyester of an aliphatic glycol having from 2 to 10 carbon atoms and the hydroxyl groups on the terminal carbon atoms, and a compound selected from the group consisting of dicarboxylic acids of the formula

HOOC—R—COOH where R is an alkylene radical having 2 to 8 carbon atoms, and the anhydrides of said acids, said polyester having an average molecular weight of from about 600 to about 2000,
(b) an aromatic diisocyanate, and
(c) a saturated, aliphatic glycol having from 2 to 6 carbon atoms and the hydroxyl groups on the terminal carbon atoms.

Said reaction product should be essentially free of any unreacted isocyanate of hydroxyl groups as exemplified by elastomers described in U.S. Pat. No. 2,871,218. However, said reaction product may contain a slight excess of isocyanate groups as the elastomers described in Industrial and Engineering Chemistry Product Research and Development 1, No. 1, 28 (1962) or a slight excess of hydroxyl groups as the elastomers described in Industrial and Engineering Chemistry 45, 2538 (1953) wherein the excess reactive groups are employed as cross-linking sites.

The polyether urethane elastomers comprise the reaction product of (a) an hydroxyl terminated alkylene oxide,
(b) an aromatic diisocyanate, and
(c) aliphatic glycol having from 2 to 6 carbon atoms and the hydroxyl groups on the terminal carbon atoms.

Said reaction product may be substantially uncrosslinked as the elastomers described in U.S. Pat. No. 2,899,411 but may also contain cross-linking sites as the elastomers described in Rubber World, July 1957.

Preferred polyesterurethanes to be used in the present invention comprise the reaction products of (a) a hydroxyl terminated polyester selected from the group consisting of poly(1,4 butane adipate), poly(neopentyl azelate), poly(ethylene adipate), poly(1,4 butane phthalate), poly(1,6 hexane adipate), poly(1,6 hexane phthalate), poly(neopentyl adipate), poly(neopentyl phthalate, poly(1,4 butane azelate), poly(ethylene phthalate), poly(1,6 hexane azelate) polycaprolactones and poly(ethylene azelate);
(b) aromatic diisocyanates selected from the group consisting of 2,4 toluene diisocyanate and diphenylmethane 4,4'-diisocyanate.
(c) saturated aliphatic glycols selected from the group consisting of ethylene glycol, propylene glycol, dipropylene glycol tetra methylene glycol, 1,3 propanediol, 1,4, butanediol, 1,5-pentanediol, and 1,6 hexanediol.

Preferred polyetherurethanes to be used comprise the reaction products of:

(a) hydroxyl terminated poly(alkylene oxide) selected from the group consisting of polytetramethylene glycol and poly(propylene glycol);

(b) said aromatic diisocyanate is selected from the group consisting of 2,4-toluene diisocyanate and diphenylmethane 4,4' diisocyanate;
(c) said aliphatic glycol is selected from the group consisting of ethylene glycol, propylene glycol, dipropylene glycol, tetramethylene glycol, 1,3-propanediol and 1,4-butanediol, 1,5-pentanediol and 1,6-hexanediol.

More particularly, the basic polyester reactant embodied in the polyesterurethane elastomer is essentially linear and is hydroxyl terminated. It is the condensation product obtained by an esterification of an aliphatic dicarboxylic acid or an anhydride thereof with a straight chain glycol containing 2 to 10 carbon atoms and having its hydroxyl groups on the terminal carbon atoms, for example, ethylene glycol, 1,3-propanediol, 1,4-butanediol, 1,5-pentanediol, 1,6-hexanediol, and the like and mixtures thereof. Examples of the aliphatic dibasic, carboxylic acid utilized in preparing the polyester are adipic, succinic, pimelic, suberic, azelaic, sebacic and the like, or their anhydrides. In the preparation of the polyesters, molar ratios of more than one mol of glycol per mol of acid are preferred so as to obtain essentially linear chains containing a preponderance of terminal hydroxyl groups. The methods and details of producing such polyesters are well known. The polyester suitable as a component of the polyesterurethane elastomer embodied in this invention is characterized by having an average molecular weight of from about 600 to 2000, a hydroxyl number of from about 50 to 180 and an acid number of less than 10, preferably less than 7. The quality of the polyesterurethane product increases as the acid number of the polyester decreases. An acid number of less than about 4.0 is thus more preferred, and an acid number of less than 2.0 is most desirable.

As previously stated, the basic polyether reactant embodied in the polyetherurethane elastomer is an alkylene oxide, having a molecular weight from about 500 to about 4,00. Preferred is hydroxyl poly(tetramethylene oxide) having a molecular weight of from about 900 to 3,000. The preferred polyetherurethanes are comprised of one mol of the hydroxyl poly(tetramethylene oxide), from 1.0 to 2.0 mols of an alkylene glycol having 2 to 6 carbon atoms, and 2.0 to 3.0 mols of a diphenyl diisocyanate, the molar amount of the hydroxyl poly(tetramethylene oxide) and alkylene glycol combined being essentially equivalent to the molar amount of diphenyl diisocyanate.

The free alkylene glycol reactant embodied in the polyurethane elastomer, i.e., the chain extender in the polymer structure, is a linear, saturated diol having 2 to 6 carbon atoms and the hydroxyl groups on the terminal carbon atoms, ethylene glycol and 1,4-butanediol being preferred.

The aromatic diisocyanate constitutent of the polyurethane is exemplified by such compounds as aromatic diisocyanates containing at least one phenyl group, and preferably diphenyl diisocyanates having an isocyanate group on each phenyl nucleus. Representative diisocyanates include para-phenylene diisocyanate, meta-phenylene diisocyanate, naphthalene - 1,5 - diisocyanate, tetrachloro m-phenylene diisocyanate, durene diisocyanate, 2, 4-toluene diisocyanate and 2,6-toluene diisocyanate and mixtures thereof, and the like, 4,4'-diphenyl diisocyanate, the dichloro-diphenyl methane diisocyanates, bibenzyl diisocyanate, bitolylene diisocyanate, the diphenyl ether diiocyanates, the dimethyl diphenyl methane diisocyanates, and preferably the diphenyl methane diisocyanates represented by

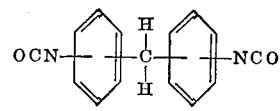

especially diphenyl methane-p,p'-diisocyanate having the formula

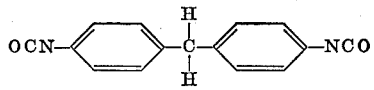

One method for preparing polyurethanes disclosed herein is set forth in U.S. Pat. 3,384,679, the contents of which are incorporated by reference herein.

In the compositions of the present invention, the polyurethane elastomer comprises between about 2 and 25 percent of the blend, and preferably between about 5 and 15 percent of the blend. Correspondingly, the polyarylene polyether resin constitutes at least 75 percent of the blend and preferably between about 85 and 95 percent of the blend.

The method of blending the polyarylene polyether resin with the polyurethane is not critical, and does not constitute a part of this invention. Preferably the resin and elastomer are physically admixed by means of any mechanical mixing device conventionally used for mixing rubbers of plastics, such as an extruder, Banbury mixer, or differential roll mill. In order to facilitate thorough mixing of the polymers and to develop the desired improved combination of physical properties, the mechanical blending is carried out at temperatures above the softening point of the resin so that the elastomer is thoroughly dispersed therein.

Alternatively the resin and elastomer may be solution blended by dissolving the polymers in a solvent such as dimethyl formamide and subsequently precipitating the polymer blend by adding the solution to a nonsolvent such as isopropanol, producing a homogeneous blend which is then dried by a suitable method.

The mixtures of the invention may contain certain other additives to plasticize, lubricate, dye, pigment, prevent oxidation of, etc., the resin blends. Such additives are well known in the art and may be incorporated without departing from the scope of the invention.

The advantage which results from this invention is that it provides a new class of polyarylene polyether resin mixtures characterized by a unique combination of physical properties. In particular, one may obtain thermoplastic compositions having substantially improved impact strength. Of note is the fact that the incorporation of a polyurethane does not detrimentally affect the high heat distortion temperature or other mechanical strength properties of the polyarylene polyether resin. Of great importance in the present invention is the capability of providing a proper balance of properties in the blend to suit individual requirements or uses.

Further benefits obtained by blending a polyurethane elastomer with a polyarylene polyether resin are illustrated in the following examples which are set forth as a further description of the invention, but are not to be construed as limiting the invention thereto.

The test data included in the following examples was determined according to ASTM procedures:

D256A–56—Notched Izod impact strength
D790–66—Flexural modulus
D648–56—Heat distortion temperatures (at 264 p.s.i.)

EXAMPLE I

A polyester urethane elastomer was blended with a polyarylene polyether resin at the 5, 10, 15 and 20 percent by weight levels. The polyester urethane, designated Estane 5740 X 140 (BFG) was prepared from poly(tetramethylene adipate) glycol, 1,4-butanediol, and 4,4'-diphenylmethane diisocyanate, and contained essentially no no excess diisocyanate or hydroxyl groups. The polyester urethane was characterized by a specific gravity of 1.11 and a hardness of 80 Shore A. The particular polyarylene polyether was designated Bakelite Polysulfone® P–1700, (sometimes referred to herein as "PSO") manufactured by Union Carbide Corp. and is the condensation polymer of 4,4'-dichlorodiphenyl sulfone and the sodium salt of bisphenol A. The polyarylene polyether resin was characterized by a specific gravity of 1.24 (20° C.) and a melt flow index of 6.5 (gr./10 min.).

The blending operations were accomplished via a Banbury internal shear mixer. The polyurethane elastomer and polyarylene polyether resin were mixed in a molten state at or above a temperature of 450° F. and at a mean shear rate of 300 sec.$^{-1}$. A mixing time of about seven minutes was sufficient to obtain a homogeneous blend of the polyurethane elastomer and the resin matrix. The blends were subsequently calendered into sheet material from which plaques were then compression molded at 350 p.s.i. at 450° F. Test specimens were machine cut from these plaques. Physical test data is summarized in Table I.

TABLE I.—COMPARISON OF RESIN AND POLYBLEND PROPERTIES

| | Percent by wt. | | Notched izod impact strength, ft. lbs./in. notch | Heat distortion temp., ° F. | Flexural modulus (p.s.i.) |
|---|---|---|---|---|---|
| | PSO | Polyester urethane | | | |
| Control PSO-P-1700 | 100 | None | 0.8 | 341 | 373,000 |
| Composition: | | | | | |
| A | 95 | 5 | 1.8 | 320 | 350,000 |
| B | 90 | 10 | 10.7 | 323 | 304,000 |
| C | 85 | 15 | 5.3 | 317 | 266,000 |
| D | 80 | 20 | 1.1 | 309 | 232,000 |

As shown in Table I, the addition of a polyester urethane significantly improves the impact strength of the polyarylene polyether resin. Note that the incorporation of the polyurethane elastomer does not detrimentally effect the high heat distortion temperature of the polyarylene polyether resin.

EXAMPLE II

A polyether urethane elastomer was blended with a polyarylene polyether resin at the 10 and 20% by weight levels. The polyether urethane, designated Roylar E–9 (Uniroyal, Inc.), was prepared from poly(tetramethylene oxide) glycol, 1,4 butanediol and 4,4'-diphenylmethane diisocyanate and contained essentially no free isocyanate or hydroxyl groups. The polyether urethane was characterized by a specific gravity of 1.14 and a hardness of 92 Shore A. The polyarylene polyether resin was that described in Example I.

The blending operations were accomplished via a Banbury internal shear mixer. The polyurethane elastomer and the polyarylene polyether resin were mixed in a molten state at or above a temperature of 415° F. and at a shear rate of approximately 500 sec.$^{-1}$. The blends were subsequently milled and calendered into sheet material from which plaques were then compression molded at 350 p.s.i. and 500° F. Test specimens were machine cut from these plaques. Physical test data is summarized in Table II.

TABLE II.—COMPARISON OF RESIN AND POLYBLEND PROPERTIES

| | Percent by wt. | | Notched izod impact strength, ft. lbs./in. notch | Heat distortion temp., ° F. | Flexural modulus (p.s.i.) |
|---|---|---|---|---|---|
| | PSO | Polyester urethane | | | |
| Control, PSO-P1700 | 100 | None | 0.8 | 314 | 373,000 |
| Composition: | | | | | |
| E | 90 | 10 | 7.5 | 327 | 310,000 |
| F | 80 | 20 | 3.0 | | 242,000 |

As shown in Table II, the addition of the polyether urethane significantly improves the impact strength of the polyarylene polyether resin. The incorporation of the polyurethane does not detrimentally affect the high heat distortion temperature of the polyarylene polyether resin.

EXAMPLE III

Polyblends containing 20% by weight of three different isocyanate-terminated polyester urethanes and a polyarylene polyether resin were prepared. These polyester urethanes, designated Texin 192-A, 355-D and 480-A (Mobay Chemical) were prepared from an hydroxyl-terminated polyester, 4,4′-diphenylmethane diisocyanate, and a diol and contained a slight excess of isocyanate. The polyester urethanes were characterized by a specific gravity of 1.23 to 1.25 and hardness values of 90, 52 and 80 Shore A respectively.

The polyblends were compounded and fabricated by procedures similar to those previously described. Physical test data is summarized in Table III.

TABLE III.—COMPARISON OF RESIN AND POLYBLEND PROPERTIES

| | Polyester urethane | Notched izod impact strength, ft. lbs./in. notch | Heat distortion temp., °F. | Flexural modulus (p.s.i.) |
|---|---|---|---|---|
| Control PSO-P1700 | None | 0.8 | 341 | 373,000 |
| Composition: | | | | |
| G | Texin 192-A | 12.9 | 331 | 260,000 |
| H | Texin 355-D | 8.1 | 321 | 274,000 |
| I | Texin 480-A | 12.0 | 329 | 249,000 |

As shown in Table III, the addition of the polyester urethane significantly improves the impact strength of the polyarylene polyether resin. The incorporation of the polyurethane does not detrimentally affect the high heat distortion temperature of the polyarylene polyether resin.

EXAMPLE IV

A polyether urethane elastomer was blended with a polyarylene polyether resin at the 10% by weight level. The polyether urethane, designated Adiprene C (Du Pont) was based on poly(tetramethylene oxide) glycol and 2,4-tolylene diisocyanate. The polyether urethane was characterized by a specific gravity of 1.07 and a Mooney viscosity of 55 (MS-10, 100° C.). The polyarylene polyether resin was that described in Example I.

The polyblend was compounded and fabricated by procedures similar to those previously described.

The impact strength increased from 0.8 for the unmodified resin to 8.8 ft. lbs./in. notch for the polyether urethane modified resin. The polyurethane does not detrimentally affect the high heat distortion temperature of the polyarylene polyether.

Because of their unique combination of physical properties and excellent flame resistant properties, the polymer blends of this invention have many and varied uses. For example, they can be used in molding powder formulations either alone or mixed with various fillers such as wood, flour, diatomaceous earth, carbon black, silica, etc., to make molded parts such as gears, bearings, and cams, especially for applications where high impact strength and flame resistance is required. They can be used to prepare molded, calendered, or extruded articles and can be applied to a broad spectrum of uses in the form of sheets, rods, tapes, etc. The compositions may also be mixed with various modifying agents such as dyes, pigments, stabilizers, plasticizers, curatives, etc.

Obviously, other modifications and variations of the present invention are possible in light of the above disclosures. It is, therefore, to be understood that changes may be made in the particular embodiments of the invention described which are within the full intended scope of the invention as defined by the appended claims.

We claim:

1. A thermoplastic resin composition comprising:
   (A) between about 75 and 98 percent (by weight) of a linear thermoplastic polyarylene polyether sulfone composed of recurring units having the formula

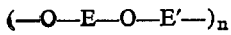

wherein E is the residuum of a dihydric phenol and E′ is the residuum of a benzenoid compound having an inert electron withdrawing group in at least one of the positions ortho and para to the valence bonds, where both of said residua are valently bonded to the ether oxygens through aromatic carbon atoms, and at least one of E and E′ provide a sulfone linkage between aromatic carbon atoms and $n$ is a positive integer of at least 15, and
   (B) correspondingly between about 2 and 25 percent of an elastomer selected from the group consisting of
      (1) a polyesterurethane comprising the reaction product of the essential ingredients:
         (a) an essentially linear, hydroxyl terminated polyester of an aliphatic glycol having from 2 to 10 carbon atoms and the hydroxyl groups on the terminal carbon atoms, and a compound selected from the group consisting of dicarboxylic acids of the formula HOOC—R—COOH where R is an alkylene radical having 2 to 8 carbon atoms, and the anhydrides of said acids, said polyester having an average molecular weight of from about 600 to about 2000,
         (b) an aromatic diisocyanate, and
         (c) a saturated, aliphatic glycol having from 2 to 6 carbon atoms and the hydroxyl groups on the terminal carbon atoms,
      (2) a polyetherurethane comprising the reaction product of the essential ingredients:
         (a) a hydroxyl terminated poly(alkylene oxide) having a molecular weight from about 500 to about 4,000.
         (b) an aromatic diisocyanate, and
         (c) aliphatic glycol having from 2 to 6 carbon atoms and the hydroxyl groups on the terminal carbon atoms.

2. The composition of claim 1 in which at least 10% of the linkages between the arylene groups in (A) are sulfone groups.

3. The composition of claim 2 in which said thermoplastic polyarylene polyether polysulfone resin contains alkylidene linkages between arylene groups.

4. A composition as in claim 1 wherein (A) is composed of recurring units having the formula

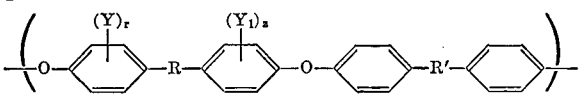

wherein R represents a member of the group consisting of a bond between aromatic carbon atoms and a divalent connecting radical and R′ represents sulfone, Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

5. A composition as in claim 1 wherein (A) is composed of recurring units of the formula:

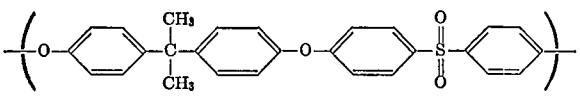

6. A composition as in claim 1 wherein (A) is composed of recurring units having the formula

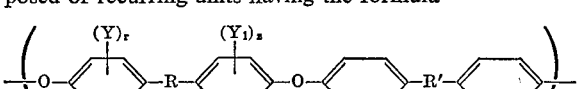

wherein R represents a member of the group consisting of a bond between aromatic carbon atoms and a divalent connecting radical and R′ represents sulfone, Y and $Y_1$ each represent inert substituent groups selected from the group consisting of halogen, alkyl groups having from 1 to 4 carbon atoms and alkoxy groups having 1 to 4 carbon atoms and where r and z are integers having a value from 0 to 4 inclusive, and (B) is selected from the group consisting of
(1) a polyesterurethane comprising the reaction product of the essential ingredients:
   (a) an essentially linear, hydroxyl terminated polyester of an aliphatic glycol having from 2 to 10 carbon atoms and the hydroxyl groups on the terminal carbon atoms, and a compound selected from the group consisting of dicarboxylic acids of the formula HOOC—R—COOH where R is an alkylene radical having 2 to 8 carbon atoms, and the anhydrides of said acids, said polyester having an average molecular weight of from about 600 to 2000,
   (b) an aromatic diisocyanate, and
   (c) a saturated, aliphatic glycol having from 2 to 6 carbon atoms and the hydroxyl groups on the terminal carbon atoms,
(2) a polyetherurethane comprising the reaction product of the essential ingredients:
   (a) a hydroxy terminated poly(alkylene oxide) having a molecular weight from about 500 to about 4,000,
   (b) an aromatic diisocyanate, and
   (c) aliphatic glycol having from 2 to 6 carbon atoms and the hydroxyl groups on the terminal carbon atoms.

7. The composition as in claim 6 wherein (A) is composed of between about 80% and 95% by weight of recurring units of the formula:

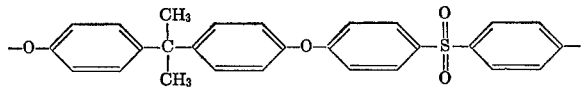

8. The thermoplastic resin defined in claim 7 wherein said polyesterurethane elastomer (1) comprises the reaction products of
   (a) a hydroxyl terminated polyester selected from the group consisting of poly(1,4 butane adipate), poly(neopentyl azelate), poly(ethylene adipate), poly(1,4 butane phthalate), poly(1,6 hexane adipate), poly(1,6 hexane phthalate), poly(neopentyl adipate), poly(neopentyl phthalate), poly (1,4 butane azelate), poly(ethylene phthalate), poly(1,6 hexane azelate) polycaprolactones and poly(ethylene azelate);
   (b) said aromatic diisocyanate is selected from the group consisting of 2,4 toluene diisocyanate and diphenylmethane, 4,4' diisocyanate; and
   (c) said saturated aliphatic glycol is selected from the group consisting of ethylene glycol, propylene glycol, dipropylene glycol, tetramethylene glycon, 1,3 propanediol, 1,4 butanediol, 1,5 pentanediol, and 1,6 hexanediol.

9. The thermoplastic resin defined in claim 7 wherein and polyetherurethane elastomer (2) comprises the reaction products of:
   (a) a hydroxyl terminated poly(alkylene oxide) selected from the group consisting of polytetramethylene glycol and poly(propylene glycol);
   (b) said aromatic diisocyanate is selected from the group consisting of 2,4 toluene diisocyanate and diphenylmethane 4,4' diisocyanate;
   (c) said aliphatic glycol is selected from the group consisting of ethylene glycol, propylene glycol, dipropylene glycol, tetramethylene glycol, 1,3 propanediol and 1,4 butanediol, 1,5 pentanediol and 1,6 hexanediol.

10. The thermoplastic resin defined in claim 7, wherein (B) is a polyesterurethane comprising the reaction product of (a) poly (ethylene adipate), (b) diphenylmethane 4,4'-diisocyanate and (c) 1,4 butanediol.

11. The thermoplastic resin defined in claim 7, where (B) is a polyesterurethane comprising the reaction product of (a) poly(ethyelne adipate), (b) 2,4-toleune diisocyanate and (c) 1,4 butanediol.

12. The thermoplastic resin defined in claim 7, wherein (B) is a polyesterurethane comprising the reaction product of (a) poly(1,6 hexane adipate), (b) diphenylmethane 4,4-diisocyanate and (c) 1,4 butanediol.

13. The thermoplastic resin defined in claim 7, wherein (B) is a polyesterurethane comprising the reaction product of (a) poly (1,6 hexane adipate), (b) 2,4-toluene diisocyanate and (c) 1,4 butanediol.

14. The thermoplastic resin defined in claim 7, wherein (B) is a polyesterurethane comprising the reaction product of (a) poly(1,4 butane adipate), (b) diphenylmethane 4,4' diisocyanate and (c) 1,4 butanediol.

15. The thermoplastic resin defined in claim 7, wherein (b) is a polyesterurethane comprising the reaction product of (a) poly(1,4 butane adipate), (b) 2,4-toluene diisocyanate and (c) 1,4 butanediol.

16. The thermoplastic resin defined in claim 7, wherein (B) is a polyesterurethane comprising the reaction product of (a) poly (neopentyl adipate), (b) diphenylmethane, 4,4'-diisocyanate and (c) 1,4 butanediol.

17. The thermoplastic resin defined in claim 7, wherein (B) is a polyesterurethane comprising the reaction product of (a) poly (neopentyl adipate), (b) 2,4-toluene diisocanate and (c) 1,4 butanediol.

18. The thermoplastic resin defined in claim 7, wherein (B) is a polyesterurethane comprising the reaction product of (a) poly (1,4-butane azelate), (b) diphenylmethane, 4,4'-diisocyanate and (c) 1,4 butanediol.

19. The thermoplastic resin defined in claim 7, wherein (B) is a polyesterurethane comprising the reaction product of (a) poly (1,4-butane azelate), (b) 2,4-toluene diisocyanate and (c) 1,4 butanediol.

20. The thermoplastic resin defined in claim 7, wherein (B) is a polyesterurethane comprising the reaction product of (a) poly (1,6 hexane azelate), (b) diphenylmethane 4,4' diisocyanate and (c) 1,4 butanediol.

21. The thermoplastic resin defined in claim 7, wherein (B) is a polyesterurethane comprising the reaction product of (a) poly (1,6 hexane azelate), (b) 2,4-toluene diisocyanate and (c) 1,4-butanediol.

22. The thermoplastic resin defined in claim 7, wherein (B) is a polyesterurethane comprising the reaction product of (a) poly (ethylene azelate), (b) diphenylmethane 4,4' diisocyanate and (c) 1,4 butanediol.

23. The thermoplastic resin defined in claim 7, wherein (B) is a polyesterurethane comprising the reaction product of (a) poly (ethylene azelate), (b) 2,4-toluene diisocyanate and (c) 1,4 butanediol.

24. The thermoplastic resin defined in claim 7, wherein (B) is a polyesterurethane comprising the reaction product of (a) poly (neopentyl azelate), (b) diphenylmethane 4,4' diisocyanate and (c) 1,4-butanediol.

25. The thermoplastic resin defined in claim 7, wherein (B) is a polyesterurethane comprising the reaction product of (a) poly (neopentyl azelate), (b) 2,4-toluene diisocyanate and (c) 1,4 butanediol.

26. The thermoplastic resin defined in claim 7, wherein (B) is a polyesterurethane comprising the reaction product of (a) poly (1,4 butane phthalate), (b) diphenylmethane 4,4' diisocyanate and (c) 1,4 butanediol.

27. The thermoplastic resin defined in claim 7, wherein (B) is a polyesterurethane comprising the reaction product of (a) poly (1,4 butane phthalate), (b) 2,4-toluene diisocyanate and (c) 1,4 butanediol.

28. The thermoplastic resin defined in claim 7, wherein (B) is a polyesterurethane comprising the reaction product of (a) poly (1,6 hexane phthalate), (b) diphenylmethane 4,4' diisocyanate and (c) 1,4 butanediol.

29. The thermoplastic resin defined in claim 7, wherein (B) is a polyesterurethane comprising the reaction product of (a) poly (1,6 hexane phthalate), (b) 2,4-toluene diisocyanate and (c) 1,4 butanediol.

30. The thermoplastic resin defined in claim 7, wherein (B) is a polyesterurethane comprising the reaction product of (a) poly (neopentyl phthalate), (b) diphenylmethane 4,4' diisocyanate and (c) 1,4-butanediol.

31. The thermoplastic defined in claim 7, wherein (B) is a polyesterurethane comprising the reaction product of (a) poly (neopentyl phthalate), (b) 2,4-toluene diisocyanate and (c) 1,4 butanediol.

32. The thermoplastic resin defined in claim 7, wherein (B) is a polyesterurethane comprising the reaction product of (a) poly (ethylene phthalate), (b), diphenylmethane 4,4' diisocyanate and (c) 1,4 butanediol.

33. The thermoplastic resin defined in claim 7, wherein (B) is a polyesterurethane comprising the reaction product of (a) poly (ethylene phthalate), (b) 2,4-toluene diisocyanate and (c) 1,4 butanediol.

34. The thermoplastic resin defined in claim 7, wherein (B) is a polyesterurethane comprising the reaction product of (a) poly (ethylene adipate), (b) diphenylmethane 4,4' diisocyanate and (c) 1,6 hexanediol.

35. The thermoplastic resin defined in claim 7, wherein (B) is a polyesterurethane comprising the reaction product of (a) poly (ethylene adipate), (b) 2,4-toluene diisocyanate and (c) 1,6 hexanediol.

36. The thermoplastic resin defined in claim 7, wherein (B) is a polyesterurethane comprising the reaction product of (a) poly (1,6 hexane adipate), (b) diphenylmethane 4,4-diisocyanate and (c) 1,6 hexanediol.

37. The thermoplastic resin defined in claim 7, wherein (B) is a polyesterurethane comprising the reaction product of (a) poly (1,6 hexane adipate), (b) 2,4-toluene diisocyanate and (c) 1,6 hexanediol.

38. The thermoplastic resin defined in claim 7, wherein (B) is a polyesterurethane comprising the reaction product of (a) poly (1,4 butane adipate), (b) diphenylmethane 4,4' diisocyanate and (c) 1,6 hexanediol.

39. The thermoplastic resin defined in claim 7, wherein (B) is a polyesterurethane comprising the reaction product of (a) poly (1,4 butane adipate), (b) 2,4-toluene diisocyanate and (c) 1,6 hexanediol.

40. The thermoplastic resin defined in claim 7, wherein (B) is a polyesterurethane comprising the reaction of (a) poly (neopentyl adipate), (b) diphenylmethane 4,4' diisocyanate and (c) 1,6 hexanediol.

41. The thermoplastic resin defined in claim 7, wherein (B) is a polyesterurethane comprising the reaction product of (a) poly (neopentyl adipate), (b) 2,4-toluene diisocyanate and (c) 1,6 hexanediol.

42. The thermoplastic resin defined in claim 7, wherein (B) is a polyesterurethane comprising the reaction product of (a) poly (1,4-butane azelate), (b) diphenylmethane 4,4' diisocyanate and (c) 1,6 hexanediol.

43. The thermoplastic resin defined in claim 7, wherein (B) is a polyesterurethane comprising the reaction product of (a) poly (1,4-butane azelate), (b) 2,4-toluene diisocyanate and (c) 1,6 hexanediol.

44. The thermoplastic resin defined in claim 7, wherein (B) is a polyesterurethane comprising the reaction product of (a) poly (1,6 hexane azelate), (b) diphenylmethane 4,4' diisocyanate and (c) 1,6 hexanediol.

45. The thermoplastic resin defined in claim 7, wherein (B) is a polyesterurethane comprising the reaction product of (a) poly (1,6 hexane azelate), (b) 2,4-toluene diisocyanate and (c) 1,6 hexanediol.

46. The thermoplastic resin defined in claim 7, wherein (B) is a polyesterurethane comprising the reaction product of (a) poly (ethylene azelate), (b) diphenylmethane 4,4' diisocyanate and (c) 1,6 hexanediol.

47. The thermoplastic resin defined in claim 7, wherein (B) is a polyesterurethane comprising the reaction product of (a) poly (ethylene azelate), (b) 2,4-toluene diisocyanate and (c) 1,6 hexanediol.

48. The thermoplastic resin defined in claim 7, wherein (B) is a polyesterurethane comprising the reaction product of (a) poly (neopentyl azelate), (b) diphenylmethane 4,4' diisocyanate and (c) 1,6 hexanediol.

49. The thermoplastic resin defined in claim 7, wherein (B) is a polyesterurethane comprising the reaction product of (a) poly (neopentyl azelate), (b) 2,4-toluene diisocyanate and (c) 1,6 hexanediol.

50. The thermoplastic resin defined in claim 7, wherein (B) is a polyesterurethane comprising the reaction product of (a) poly (1,4 butane phthalate), (b) diphenylmethane 4,4' diisocyanate and (c) 1,6 hexanediol.

51. The thermoplastic resin defined in claim 7, wherein (B) is a polyesterurethane comprising the reaction product of (a) poly (1,4 butane phthalate), (b) 2,4-toluene diisocyanate and (c) 1,6 hexanediol.

52. The thermoplastic resin defined in claim 7, wherein (B) is a polyesterurethane comprising the reaction product of (a) poly (1,6 hexane phthalate), (b) diphenylmethane 4,4' diisocyanate and (c) 1,6 hexanediol.

53. The thermoplastic resin defined in claim 7, wherein (B) is a polyesterurethane comprising the reaction product of (a) poly (1,6 hexane phthalate), (b) 2,4-toluene diisocyanate and (c) 1,6 hexanediol.

54. The thermoplastic resin defined in claim 7, wherein (B) is a polyesterurethane comprising the reaction product of (a) poly (neopentyl phthalate), (b) diphenylmethane 4,4' diisocyanate and (c) 1,6 hexanediol 55. The thermoplastic resin defined in claim 7, wherein (B) is a polyesterurethane comprising the reaction product of (a) poly (neopentyl phthalate), (b) 2,4-toluene diisocyanate and (c) 1,6 hexanediol.

56. The thermoplastic resin defined in claim 7, wherein (B) is a polyesterurethane comprising the reaction product of (a) poly (ethylene phthalate), (b) diphenylmethane 4,4' diisocyanate and (c) 1,6 hexanediol.

57. The thermoplastic resin defined in claim 7, wherein (B) is a polyesterurethane comprising the reaction product of (a) poly (ethylene phthalate), (b) 2,4-toluene diisocyanate and (c) 1,6 hexanediol.

58. The thermoplastic resin defined in claim 7, wherein (B) is a polyesterurethane comprising the reaction product of (a) poly (ethylene adipate), (b) diphenylmethane 4,4' diisocyanate and (c) ethylene glycol.

59. The thermoplastic resin defined in claim 7, wherein (B) is a polyesterurethane comprising the reaction product of (a) poly (ethylene adipate), (b) 2,4-toluene diisocyanate and (c) ethylene glycol.

60. The thermoplastic resin defined in claim 7, wherein (B) is a polyesterurethane comprising the reaction product of (a) poly (1,6 hexane adipate), (b) diphenylmethane 4,4-diisocyanate and (c) ethylene glycol.

61. The thermoplastic resin defined in claim 7, wherein (B) is a polyesterurethane comprising the reaction product of (a) poly (1,6 hexane adipate), (b) 2,4-toluene diisocyanate and (c) ethylene glycol.

62. The thermoplastic resin defined in claim 7, wherein (B) is a polyesterurethane comprising the reaction product of (a) poly (1,4 butane adipate), (b) diphenylmethane 4,4' diisocyanate and (c) ethylene glycol.

63. The thermoplastic resin defined in claim 7, wherein (B) is a polyesterurethane comprising the reaction product of (a) poly (1,4 butane adipate), (b) 2,4-toluene diisocyanate and (c) 1,4 ethylene glycol.

64. The thermoplastic resin defined in claim 7, wherein (B) is a polyesterurethane comprising the reaction product of (a) poly (neopentyl adipate), (b) diphenylmethane 4,4' diisocyanate and (c) ethylene glycol.

65. The thermoplastic resin defined in claim 7, wherein (B) is a polyesterurethane comprising the reaction product of (a) poly (neopentyl adipate), (b) 2,4-toluene diisocyanate and (c) ethylene glycol.

66. The thermoplastic resin defined in claim 7, wherein (B) is a polyesterurethane comprising the reaction product of (a) poly (1,4-butane azelate), (b) diphenylmethane 4,4' diisocyanate and (c) ethylene glycol.

67. The thermoplastic resin defined in claim 7, wherein (B) is a polyesterurethane comprising the reaction product of (a) poly (1,4-butane azelate), (b) 2,4-toluene diisocyanate and (c) ethylene glycol.

68. The thermoplastic resin defined in claim 7, wherein (B) is a polyesterurethane comprising the reaction product of (a) poly (1,6 hexane azelate), (b) diphenylmethane 4,4' diisocyanate and (c) ethylene glycol.

69. The thermoplastic resin defined in claim 7, wherein (B) is a polyesterurethane comprising the reaction product of (a) poly (1,6 hexane azelate), (b) 2,4-toluene diisocyanate and (c) ethylene glycol.

70. The thermoplastic resin defined in claim 7, wherein (B) is a polyesterurethane comprising the reaction product of (a) poly (ethylene azelate), (b) diphenylmethane 4,4' diisocyanate and (c) ethylene glycol.

71. The thermoplastic resin defined in claim 7, wherein (B) is a polyesterurethane comprising the reaction product of (a) poly (ethylene azelate), (b) 2,4-toluene diisocyanate and (c) ethylene glycol.

72. The thermoplastic resin defined in claim 7, wherein (B) is a polyesterurethane comprising the reaction product of (a) poly (neopentyl azelate), (b) diphenylmethane 4,4' diisocyanate and (c) ethylene glycol.

73. The thermoplastic resin defined in claim 7, wherein (B) is a polyesterurethane comprising the reaction product of (a) poly (neopentyl azelate), (b) 2,4-toluene diisocyanate and (c) ethylene glycol.

74. The thermoplastic resin defined in claim 7, wherein (B) is a polyesterurethane comprising the reaction product of (a) poly (1,4 butane phthalate), (b) diphenylmethane 4,4' diisocyanate and (c) ethylene glycol.

75. The thermoplastic resin defined in claim 7, wherein (B) is a polyesterurethane comprising the reaction product of (a) poly (1,4 butane phthalate, (b) 2,4-toluene diisocyanate and (c) ethylene glycol.

76. The thermoplastic resin defined in claim 7, wherein (B) is a polyesterurethane comprising the reaction product of (a) poly (1,6 hexane phthalate), (b) diphenylmethane 4,4' diisocyanate and (c) ethylene glycol.

77. The thermoplastic resin defined in claim 7, wherein (B) is a polyesterurethane comprising the reaction product of (a) poly (1,6 hexane phthalate), (b) 2,4-toluene diisocyanate and (c) ethylene glycol.

78. The thermoplastic resin defined in claim 7, wherein (B) is a polyesterurethane comprising the reaction product of (a) poly (neopentyl phthalate), (b) diphenylmethane 4,4' diisocyanate and (c) ethylene glycol.

79. The thermoplastic resin defined in claim 7, wherein (B) is a polyesterurethane comprising the reaction product of (a) poly (neopentyl phthalate), (b) 2,4-toluene diisocyanate and (c) ethylene glycol.

80. The thermoplastic resin defined in claim 7, wherein (B) is a polyesterurethane comprising the reaction product of (a) poly (ethylene phthalate), (b) diphenylmethane 4,4' diisocyanate and (c) ethylene glycol.

81. The thermoplastic resin defined in claim 7, wherein (B) is a polyesterurethane comprising the reaction product of (a) poly (ethylene phthalate), (b) 2,4-toluene diisocyanate and (c) ethylene glycol.

82. The thermoplastic resin defined in claim 7, wherein (B) is a polyesterurethane comprising the reaction product of (a) poly (ethylene adipate), (b) diphenylmethane 4,4' diisocyanate and (c) propylene glycol.

83. The thermoplastic resin defined in claim 7, wherein (B) is a polyesterurethane comprising the reaction product of (a) poly (ethylene adipate), (b) 2,4-toluene diisocyanate and (c) propylene glycol.

84. The thermoplastic resin defined in claim 7, wherein (B) is a polyesterurethane comprising the reaction product of (a) poly (1,6 hexane adipate), (b) diphenylmethane 4,4' diisocyanate and (c) propylene glycol.

85. The thermoplastic resin defined in claim 7, wherein (B) is a polyesterurethane comprising the reaction product of (a) poly (1,6 hexane adipate), (b) 2,4-toluene diisocyanate and (c) propylene glycol.

86. The thermoplastic resin defined in claim 7, wherein (B) is a polyesterurethane comprising the reaction product of (a) poly (1,4 butane adipate), (b) diphenylmethane 4,4' diisocyanate and (c) propylene glycol.

87. The thermoplastic resin defined in claim 7, wherein (B) is a polyesterurethane comprising the reaction product of (a) poly (1,4 butane adipate), (b) 2,4-toluene diisocyanate and (c) propylene glycol.

88. The thermoplastic resin defined in claim 7, wherein (B) is a polyesterurethane comprising the reaction product of (a) poly (neopentyl adipate), (b) diphenylmethane 4,4' diisocyanate and (c) propylene glycol.

89. The thermoplastic resin defined in claim 7, wherein (B) is a polyesterurethane comprising the reaction product of (a) poly (neopentyl adipate), (b) 2,4-toluene diisocyanate and (c) propylene glycol.

90. The thermoplastic resin defined in claim 7, wherein (B) is a polyesterurethane comprising the reaction product of (a) poly (1,4-butane azelate), (b) diphenylmethane 4,4' diisocyanate and (c) propylene glycol.

91. The thermoplastic resin defined in claim 7, wherein (B) is a polyesterurethane comprising the reaction product of (a) poly (1,4-butane azelate), (b) 2,4-toluene diisocyanate and (c) propylene glycol.

92. The thermoplastic resin defined in claim 7, wherein (B) is a polyesterurethane comprising the reaction product of (a) poly (1,6 hexane azelate), (b) diphenylmethane 4,4' diisocyanate and (c) propylene glycol.

93. The thermoplastic resin defined in claim 7, wherein (B) is a polyesterurethane comprising the reaction product of (a) poly (1,6 hexane azelate), (b) 2,4-toluene diisocyanate and (c) propylene glycol.

94. The thermoplastic resin defined in claim 7, wherein (B) is a polyesterurethane comprising the reaction product of (a) poly (ethylene azelate), (b) diphenylmethane 4,4' diisocyanate and (c) propylene glycol.

95. The thermoplastic resin defined in claim 7, wherein (B) is a polyesterurethane comprising the reaction product of (a) poly (ethylene azelate), (b) 2,4-toluene diisocyanate and (c) propylene glycol.

96. The thermoplastic resin defined in claim 7, wherein (B) is a polyesterurethane comprising the reaction product of (a) poly (neopentyl azelate), (b) diphenylmethane 4,4' diisocyanate and (c) propylene glycol.

97. The thermoplastic resin defined in claim 7, wherein (B) is a polyesterurethane comprising the reaction product of (a) poly (neopentyl azelate), (b) 2,4-toluene diisocyanate and (c) propylene glycol.

98. The thermoplastic resin defined in claim 7, wherein (B) is a polyesterurethane comprising the reaction product of (a) poly (1,4 butane phthalate), (b) diphenylmethane 4,4' diisocyanate and (c) propylene glycol.

99. The thermoplastic resin defined in claim 7, wherein (B) is a polyesterurethane comprising the reaction product of (a) poly (1,4 butane phthalate), (b) 2,4-toluene diisocyanate and (c) propylene glycol.

100. The thermoplastic resin defined in claim 7, wherein (B) is a polyesterurethane comprising the reaction product of (a) poly (1,6 hexane phthalate), (b) diphenylmethane 4,4' diisocyanate and (c) propylene glycol.

101. The thermoplastic resin defined in claim 7, wherein (B) is a polyesterurethane comprising the reaction product of (a) poly (1,6 hexane phthalate), (b) 2,4-toluene diisocyanate and (c) propylene glycol.

102. The thermoplastic resin defined in claim 7, wherein (B) is a polyesterurethane comprising the reaction product of (a) poly (neopentyl phthalate), (b) diphenylmethane 4,4' diisocyanate and (c) propylene glycol.

103. The thermoplastic resin defined in claim 7, wherein (B) is a polyesterurethane comprising the reaction product of (a) poly (neopentyl phthalate), (b) 2,4-toluene diisocyanate and (c) propylene glycol.

104. The thermoplastic resin defined in claim 7, wherein (B) is a polyesterurethane comprising the reaction product of (a) poly (ethylene phthalate), (b) disphenylmethane 4,4'-diisocyanate and (c) propylene glycol.

105. The thermoplastic resin defined in claim 7, wherein (B) is a polyesterurethane comprising the reaction product of (a) poly (ethylene phthalate), (b) 2,4-toluene diisocyanate and (c) propylene glycol.

106. The thermoplastic resin defined in claim 7, wherein (B) is a polyesterurethane comprising the reaction product of (a) poly (ethylene adipate), (b) diphenylmethane 4,4' diisocyanate and (c) 1,5 pentanediol.

107. The thermoplastic resin defined in claim 7, wherein (B) is a polyesterurethane comprising the reaction product of (a) poly (ethylene adipate), (b) 2,4-toluene diisocyanate and (c) 1,5 pentanediol.

108. The thermoplastic resin defined in claim 7, wherein (B) is a polyesterurethane comprising the reaction product of (a) poly (1,6 hexane adipate), (b) diphenylmethane 4,4'-diisocyanate and (c) 1,5 pentanediol.

109. The thermoplast resin defined in claim 7, wherein (B) is a polyesterurethane comprising the reaction product of (a) poly (1,6 hexane adipate), (b) 2,4-toluene diisocyanate and (c) 1,5 pentanediol.

110. The thermoplastic resin defined in claim 7, wherein (B) is a polyesterurethane comprising the reaction product of (a) poly (1,4 butane adipate), (b) diphenylmethane 4,4' diisocyanate and (c) 1,5 pentanediol.

111. The thermoplastic resin defined in claim 7, wherein (B) is a polyesterurethane comprising the reaction product of (a) poly (1,4 butane adipate), (b) 2,4-toluene diisocyanate and (c) 1,5-pentanediol.

112. The thermoplastic resin defined in claim 7, wherein (B) is a polyesterurethane comprising the reaction product of (a) poly (neopentyl adipate), (b) diphenylmethane 4,4' diisocyanate and (c) 1,5 pentanediol.

113. The thermoplastic resin defined in claim 7, wherein (B) is a polyesterurethane comprising the reaction product of (a) poly (neopentyl adipate), (b) 2,4-toluene diisocyanate and (c) 1,5 pentanediol.

114. The thermoplastic resin defined in claim 7, wherein (B) is a polyesterurethane comprising the reaction product of (a) poly (1,4-butane azelate), (b) diphenylmethane 4,4' diisocyanate and (c) 1,5 pentanediol.

115. The thermoplastic resin defined in claim 7, wherein (B) is a polyesterurethane comprising the reaction product of (a) poly (1,4-butane azelate), (b) 2,4-toluene diisocyanate and (c) 1,5 pentanediol.

116. The thermoplastic resin defined in claim 7, wherein (B) is a polyesterurethane comprising the reaction product of (a) poly (1,6 hexane azelate), (b) diphenylmethane 4,4' diisocyanate and (c) 1,5 pentanediol.

117. The thermoplastic resin defined in claim 7, wherein (B) is a polyesterurethane comprising the reaction product of (a) poly (1,6 hexane azelate), (b) 2,4-toluene diisocyanate and (c) 1,5 pentanediol.

118. The thermoplastic resin defined in claim 7, wherein (B) is a polyesterurethane comprising the reaction product of (a) poly (ethylene azelate), (b) diphenylmethane 4,4' diisocyanate and (c) 1,5 pentanediol.

119. The thermoplastic resin defined in claim 7, wherein (B) is a polyesterurethane comprising the reaction product of (a) poly (ethylene azelate), (b) 2,4-toluene diisocyanate and (c) 1,5 pentanediol 120. The thermoplastic resin defined in claim 7, wherein (B) is a polyesterurethane comprising the reaction product of (a) poly (neopentyl azelate) (b) diphenylmethane 4,4' diisocyanate and (c) 1,5 pentanediol.

121. The thermoplastic resin defined in claim 7, wherein (B) is a polyesterurethane comprising the reaction product of (a) poly (neopentyl azelate), (b) 2,4-toluene diisocyanate and (c) 1,5 pentanediol.

122. The thermoplastic resin defined in claim 7, wherein (B) is a polyesterurethane comprising the reaction product of (a) poly (1,4 butane phthalate), (b) diphenylmethane 4,4'- diisocyanate and (c) 1,5 pentanediol.

123. The thermoplastic resin defined in claim 7, wherein (B) is a polyesterurethane comprising the reaction product of (a) poly (1,4 butane phthalate) (b) 2,4-toluene diisocyanate and (c) 1,5 pentanediol.

124. The thermoplastic resin defined in claim 7, wherein (B) is a polyesterurethane comprising the reaction product of (a) poly (1,6 hexane phthalate), (b) diphenylmethane 4,4'- diisocyanate and (c) 1,5 pentanediol.

125. The thermoplastic resin defined in claim 7, wherein (B) is a polyesterurethane comprising the reaction product of (a) poly (1,6 hexane phthalate), (b) 2,4-tolulene diisocyanate and (c) 1,5 pentanediol.

126. The thermoplastic resin defined in claim 7, wherein (B) is a polyesterurethane comprising the reaction product of (a) poly (neopentyl phthalate), (b) diphenylmethane 4,4'- diisocyanate and (c) 1,5 pentanediol.

127. The thermoplastic resin defined in claim 7, wherein (B) is a polyesterurethane comprising the reaction product of (a) poly (neopentyl phthalate) (b) 2,4-toluene diisocyanate and (c) 1,5 pentanediol.

128. The thermoplastic resin defined in claim 7, wherein (B) is a polyesterurethane comprising the reaction product of (a) poly (ethylene phthalate), (b) diphenylmethane 4,4' diisocyanate and (c) 1,5 pentanediol.

129. The thermoplastic resin defined in claim 7, wherein (B) is a polyesterurethane comprising the reaction product of (a) poly (ethylene phthalate), (b) 2,4-toluene diisocyanate and (c) 1,5 pentanediol.

130. The thermoplastic resin defined in claim 7, wherein (B) is a polyesterurethane comprising the reaction product of (a) polycaprolactone, (b) diphenylmethane 4,4'-diisocyanate and (c) 1,4-butanediol.

131. The thermoplastic resin defined in claim 7, wherein (B) is a polyesterurethane comprising the reaction product of (a) polycaprolacetone, (b) 2,4-toluene diisocyanate and (c) 1,4 butanediol.

132. The thermoplastic resin defined in claim 7, wherein (B) is a polesterurethane comprising the reaction product of (a) polycaprolactone, (b) diphenylmethane, 4,4'-diisocyanate and (c) 1,6 hexanediol.

133. The thermoplastic resin defined in claim 7, wherein (B) is a polyesterurethane comprising the reaction product of (a) polycaprolactone, (b) 2,4-toluene diisocyanate and (c) 1,6 hexanediol.

134. The thermoplastic resin defined in claim 7, wherein (B) is a polyesteurethane comprising the reaction product of (a) polycaprolactone, (b) diphenylmethane 4,4' diisocyanate and (c) ethylene glycol.

135. The thermoplastic resin defined in claim 7, wherein (B) is a polyesterurethane comprising the reaction product of (a) polycaprolactone, (b) 2,4-toluene diisocyanate and (c) ethylene glycol.

136. The thermoplastic resin defined in claim 7, wherein (B) is a polyesterurethane comprising the reaction product of (a) polycaprolactone, (b) diphenylmethane 4,4'-diisocyanate and (c) propylene glycol.

137. The thermoplastic resin defined in claim 7, wherein (B) is a polyesterurethane comprising the reaction product of (a) polycaprolactone, (b) 2,4-toluene diisocyanate and (c) propylene glycol.

138. The thermoplastic resin defined in claim 7, wherein (B) is a polyesterurethane comprising the reaction product of (a) polycaprolactone, (b) diphenylmethane 4,4' diisocyanate and (c) 1,5 pentanediol.

139. The thermoplastic resin defined in claim 7, wherein (B) is a polyesterurethane comprising the reaction product of (a) polycaprolactone, (b) 2,4-toluene diisocyanate and (c) 1,5 pentanediol.

140. The thermoplastic resin defined in claim 7, wherein (B) is a polyetherurethane comprising the reaction product of (a) poly(tetramethylene oxide glycol), (b) diphenylmethane 4,4' diisocyanate and (c) 1,4 butanediol.

141. The thermoplastic resin defined in claim 7, wherein (B) is a polyetherurethane comprising the reaction product of (a) poly(tetramethylene glycol), (b) 2,4-toluene diisocyanate and (c) 1,4-butanediol.

142. The thermoplastic resin defined in claim 7, wherein (B) is a polyetherurethane comprising the reaction product of (a) poly(tetramethylene glycol), (b) diphenylmethane 4,4′ diisocyanate ad (c) 1,6 hexanediol.

143. The thermoplastic resin defined in claim 7, wherein (B) is a polyetherurethane comprising the reaction product of (a) poly(tetramethylene glycol), (b) 2,4-toluene diisocyanate and (c) 1,6 hexanediol.

144. The thermoplastic resin defined in claim 7, wherein (B) is a polyetherurethane comprising the reaction product of (a) poly(tetramethylene glycol), (b) diphenylmethane 4,4′ diisocyanate and (c) ethylene glycol.

145. The thermoplastic resin defined in claim 7, wherein (B) is a polyetherurethane comprising the reaction product of (a) poly(tetramethylene glycol), (b) 2,4-toluene diisocyanate and (c) ethylene glycol.

146. The thermoplastic resin defined in claim 7, wherein (B) is a polyetherurethane comprising the reaction product of (a) poly(tetramethylene glycol), (b) diphenylmethane 4,4′ diisocyanate and (c) propylene glycol.

147. The thermoplastic resin defined in claim 7, wherein (B) is a polyetherurethane comprising the reaction product of (a) poly(tetramethylene glycol), (b) 2,4-toluene diisocyanate and (c) propylene glycol.

148. The thermoplastic resin defined in claim 7, wherein (B) is a polyetherurethane comprising the reaction product of (a) poly(tetramethylene glycol), (b) diphenylmethane 4,4′ diisocyanate and (c) 1,5 pentanediol.

149. The thermoplastic resin defined in claim 7, wherein (B) is a polyetherurethane comprising the reaction product of (a) poly(tetramethylene glycol), (b) 2,4-toluene diisocyanate and (c) 1,5 pentanediol.

150. The thermoplastic resin defined in claim 7, wherein (B) is a polyetherurethane comprising the reaction product of (a) poly(propylene glycol), (b) diphenylmethane 4,4′ diisocyanate and (c) 1,4-butanediol.

151. The thermoplastic resin defined in claim 7, wherein (B) is a polyetherurethane comprising the reaction product of (a) poly(propylene glycol), (b) 2,4-toluene diisocyanate and (c) 1,4 butanediol.

152. The thermoplastic resin defined in claim 7, wherein (B) is a polyetherurethane comprising the reaction product of (a) poly(propylene glycol), (b) diphenylmethane 4,4′ diisocyanate and (c) 1,6 hexanediol.

153. The thermoplastic resin defined in claim 7, wherein (B) is a polyetherurethane comprising the reaction product of (a) poly(propylene glycol), (b) 2,4-toluene diisocyanate and (c) 1,6 hexanediol.

154. The thermoplastic resin defined in claim 7, wherein (B) is a polyetherurethane comprising the reaction product of (a) poly(propylene glycol), (b) diphenylmethane 4,4′ diisocyanate and (c) ethylene glycol.

155. The thermoplastic resin defined in claim 7, wherein (B) is a polyetherurethane comprising the reaction product of (a) poly(propylene glycol), (b) 2,4-toluene diuct of (a) poly(propylene glycol), (b) 2,4-toluene diisocyanate and (c) ethylene glycol.

156. The thermoplastic resin defined in claim 7, wherein (B) is a polyetherurethane comprising the reaction product of (a) poly(propylene glycol), (b) diphenylmethane 4,4′ diisocyanate and (c) propylene glycol.

157. The thermoplastic resin defined in claim 7, wherein (B) is a polyetherurethane comprising the reaction product of (a) poly(propylene glycol), (b) 2,4-toluene diisocyanate and (c) propylene glycol.

158. The thermoplastic resin defined in claim 7, wherein (B) is a polyetherurethane comprising the reaction product of (a) poly(propylene glycol), (b) diphenylmethane 4,4′ diisocyanate and (c) 1,5 pentanediol.

159. The thermoplastic resin defined in claim 7, wherein (B) is a polyetherurethane comprising the reaction product of (a) poly(propylene glycol), (b) 2,4-toluene diisocyanate and (c) 1,5 pentanediol.

References Cited
UNITED STATES PATENTS

| | | | |
|---|---|---|---|
| 3,379,694 | 4/1968 | Rutledge | 260—858 |
| 3,431,238 | 3/1969 | Borman | 260—858 |
| 3,479,325 | 11/1969 | Blomeyer | 260—858 |
| 3,636,301 | 5/1973 | Berenbaum | 260—858 |

PAUL LIEBERMAN, Primary Examiner

U.S. Cl. X.R.

260—47 R, 49, 75 TN, 77.5 AP